United States Patent [19]

Sawdon

[11] Patent Number: 4,722,647
[45] Date of Patent: Feb. 2, 1988

[54] SELF-ATTACHING FASTENER FOR SHEET MATERIAL

[75] Inventor: Edwin G. Sawdon, Marysville, Mich.

[73] Assignee: BTM Corporation, Marysville, Mich.

[21] Appl. No.: 806,506

[22] Filed: Dec. 9, 1985

Related U.S. Application Data

[60] Division of Ser. No. 678,368, Dec. 5, 1984, Pat. No. 4,574,473, which is a continuation of Ser. No. 373,621, Apr. 30, 1982, abandoned.

[51] Int. Cl.$^4$ .................. F16B 37/04; F16B 27/00
[52] U.S. Cl. ........................... 411/180; 411/84; 411/966
[58] Field of Search ................... 411/93–95, 411/97, 98, 84, 103, 107, 174–177, 179, 966, 180, 181; 29/243.5, 432, 432.1, 432.2, 798; 403/242, 263

[56] References Cited

U.S. PATENT DOCUMENTS

| Re. 31,535 | 3/1984 | Schleicher | 29/798 |
| 679,137 | 7/1901 | Baxter | 411/97 |
| 1,985,333 | 12/1934 | Wiley | 411/107 |
| 2,632,929 | 3/1953 | Poupitch | 411/966 |
| 2,937,681 | 5/1960 | Patten | 411/181 |
| 3,178,749 | 4/1965 | Heepe | 411/966 |
| 4,525,912 | 7/1985 | Kazino et al. | |

Primary Examiner—Neill Wilson
Attorney, Agent, or Firm—Harness, Dickey & Pierce

[57] ABSTRACT

An assembly is disclosed having a simple, standard fastener secured to sheet material such as sheet metal. A support strap is integrally formed in an offset relationship with the sheet material, and opposite sides of the fastener are deformed to interlockingly engage the remainder of the sheet material. A method and apparatus are also disclosed for securing the fastener to the sheet material in substantially one operation, including alternate manual and automatic means for feeding fasteners to such apparatus.

28 Claims, 13 Drawing Figures

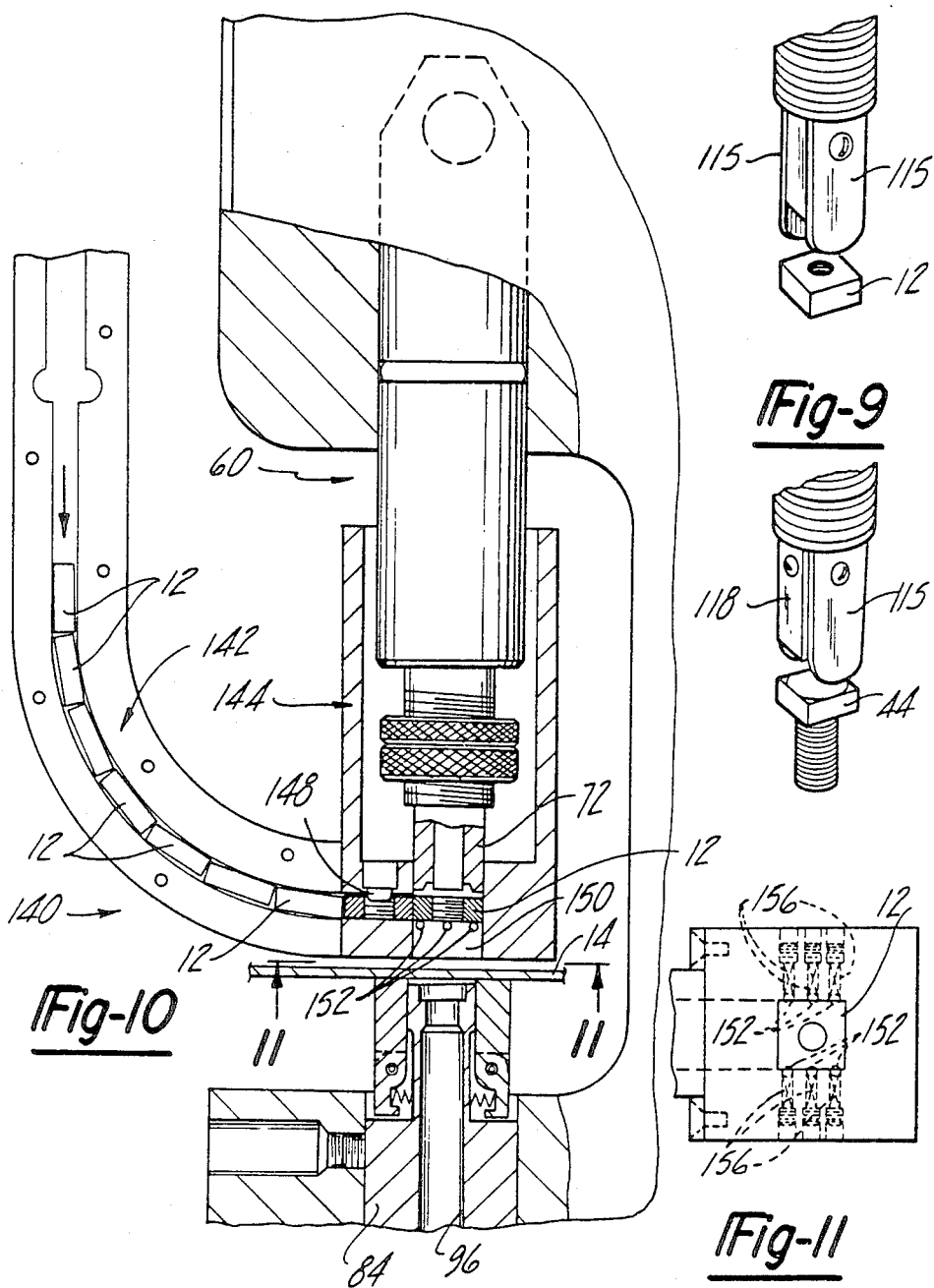

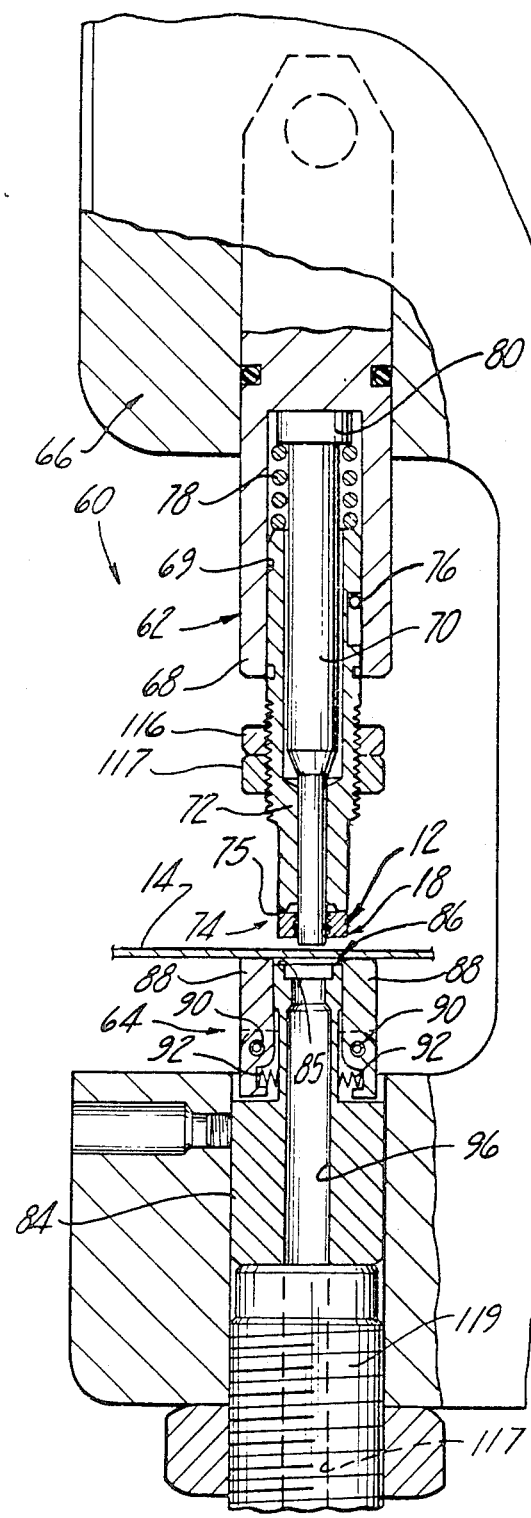
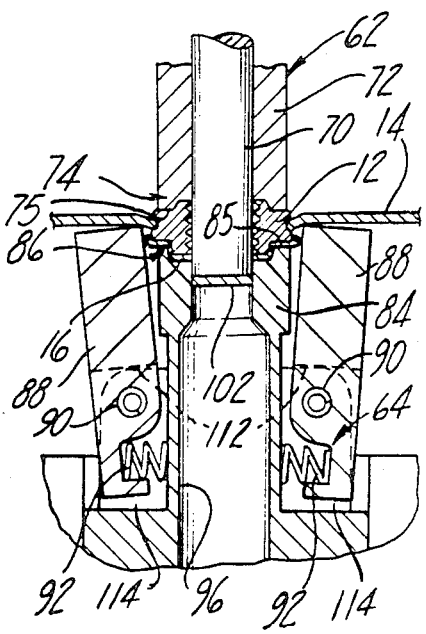
Fig-13
Fig-12

SELF-ATTACHING FASTENER FOR SHEET MATERIAL

This is a division of application Ser. No. 678,368, filed Dec. 5, 1984, now U.S. Pat. No. 4,574,473, which was a continuation of application Ser. No. 373,621, filed Apr. 30, 1982, now abandoned.

BACKGROUND AND SUMMARY OF THE INVENTION

The invention relates to a self-attaching fastener and more particularly to a threaded fastener that is forcibly mechanically interlocked or clinchingly attached to a portion of sheet material, and to apparatus and a method of assembly thereof.

Reference is made to my related patent application, Ser. No. 184,951, filed Sept. 8, 1980, the disclosure of which is incorporated by reference herein. Said application Ser. No. 184,951 is now abandoned in favor of its continuation application Ser. No. 495,440, filed May 17, 1983, which issued on July 17, 1984, as U.S. Pat. No. 4,459,753. The present invention disclosed herein includes variations on the inventive principles disclosed in said related application.

It is frequently desirable to secure objects to a member formed from a relatively thin sheet of material, such as sheet metal. Because such sheet material is generally too thin to form a threaded hole therein by drilling and tapping, a threaded female fastener or nut is frequently welded or otherwise secured to such sheet material, thus allowing a male fastener to be threadably secured thereto.

Alternatively, it may be desirable to provide a threaded male fastener extending from such sheet material in order to allow another object to be mounted thereto by means of a threaded female fastener. In such a case, the head of a bolt may be welded or otherwise secured to such sheet material.

In one known method of securing a threaded fastener to sheet material, a specially formed clinch nut is fabricated with a pilot portion extending from one of its faces. The pilot is smaller than the remainder of the nut and thus forms one or more shoulder portions thereon. The pilot is inserted into a preformed opening in the sheet material and deformed to flow outwardly, thereby interlockingly engaging the edges of the preformed hole in the sheet material.

In another method of securing a threaded fastener to sheet material, a specially formed pierce nut with a pilot is provided which is specially adapted to pierce or punch an opening as the nut is forcibly urged against the sheet material. Specially formed dies on a press apparatus deform the sides of the pilot and the opening in the sheet material to form a clinch-type engagement therebetween. Such specially formed and fabricated pierce nuts may also include shoulders on the main portion of the nut for abuttingly engaging the sheet material in order to attain a more even stress distribution, thereby strengthening the joint between the nut and the sheet material.

The above-described methods and apparatus for securing a fastener to sheet material suffer the disadvantage of requiring an expensive specially formed nut or fastener. Such methods and apparatus also tend to weaken the sheet material because of the necessity of removing a substantial amount of sheet material in order to form the opening in which the fastener is received. In a high production environment, they also create a considerable amount of scrap.

The present invention overcomes the above disadvantages by allowing standard fasteners such as ordinary nuts or bolts to be secured to a sheet material member, thereby eliminating the need for the expensive special fasteners described above. In the disclosed embodiment of the invention, a standard off-the-shelf square nut or a square-headed bolt is secured to such sheet material, frequently without preforming an opening in the sheet material, thereby eliminating or minimizing the attendant scrap. In accordance with the present invention, the sheet material is sheared by means of the coactive force of a pair of cutting members and the edges of the fastener along opposite sides of the fastener to form a support strap therebetween. This strap, which remains integral with the sheet material, is simultaneously forcibly urged into an offset position relative to the plane of the remainder of the sheet material and preferably abuttingly conforms to at least one of the faces of the fastener. The opposite sides of the fastener, adjacent the sheared portion of the sheet material, are deformed to interlock the fastener to the sheet material.

Thus the present invention provides a method and apparatus by which ordinary fasteners can be rigidly secured or attached to a sheet material member without the need for specially formed fasteners. Furthermore, because the only sheet material removed (if any) is that resulting from the punching of a hole in the support strap which corresponds to the aperture through a female fastener, or which receives the stud portion of the male fastener, the sheet material is not substantially weakened by the forming or pressing operation and significantly less scrap is generated.

These and other advantages of the invention will become readily apparent from the following discussion and the accompanying drawings.

BRIEF DESCRIPTION OF THE DRAWINGS

FIG. 8 is a partial perspective view of the forming die portion of the FIG. 7 apparatus, illustrating a retaining spring arrangement for holding a female fastener.

FIG. 9 is a view similar to that of FIG. 8, illustrating an alternate retaining spring arrangement for holding a male fastener.

FIG. 10 illustrates an alternate fastener feeding mechanism for the apparatus of FIG. 7.

FIG. 11 is a view taken along line 11—11 of FIG. 10.

FIG. 12 is a cross-sectional view of the fastener and the press and die portions of the FIG. 7 apparatus, prior to the forming stroke.

FIG. 13 is an enlarged cross-sectional view similar to that of FIG. 12, but illustrating the fastener and forming components at the end of the forming stroke.

DETAILED DESCRIPTION OF THE PREFERRED EMBODIMENTS

FIGS. 1 through 13 of the drawings illustrate various embodiments of fasteners secured to sheet material members according to the present invention, as well as an apparatus for forming the assembly. For purposes of illustration, the drawings illustrate embodiments wherein a standard square nut and a standard square-headed bolt are secured to the sheet material. One skilled in the art will readily recognize, however, that other fasteners having other shapes may also be secured to sheet material in a similar manner.

Figure 1:
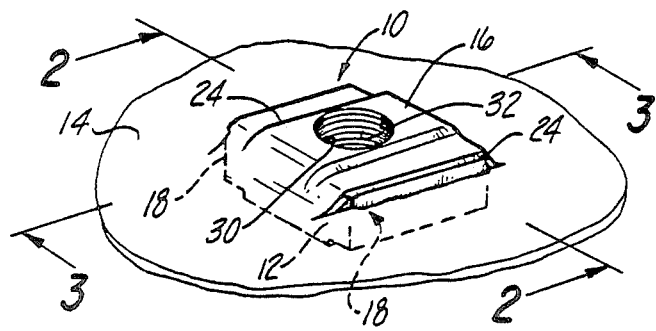
FIG. 1 is a perspective view of the fastener assembly of the present invention, illustrating a female fastener secured to sheet material.
Figure 2:
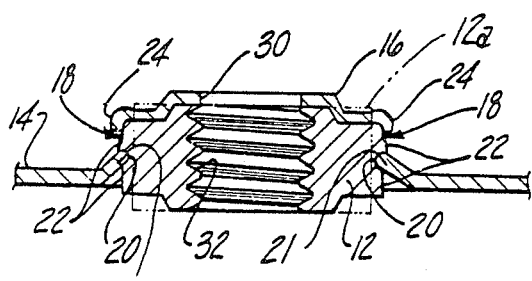
FIG. 2 is a cross-sectional view taken along line 2—2 of FIG. 1.
Figure 3:
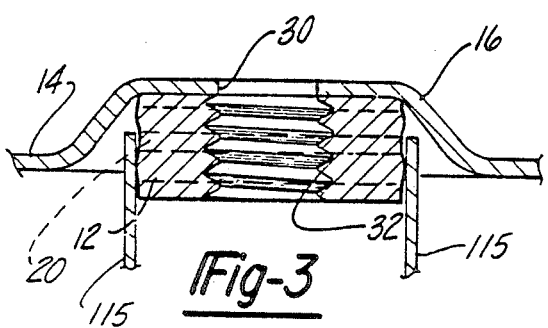
FIG. 3 is a cross-sectional view taken along line 3—3 of FIG. 1.
Figure 7:
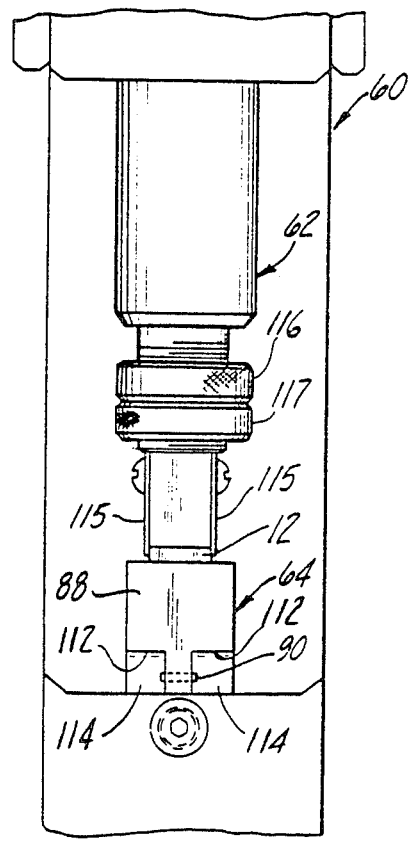
FIG. 7 is an elevational view of the press and forming die portions of an apparatus for securing a fastener to sheet material according to the present invention.

FIGS. 1 through 3 illustrate a fastener assembly 10 in which a female fastener 12 is rigidly secured to sheet material 14. Prior to assembly, fastener 12 is a simple inexpensive square nut having a central threaded hole 32, as is shown in phantom lines at 12a. Sheet material 14 includes an integral support strap 16 positioned in an offset relation relative to the plane of the remainder of the sheet. Support strap 16 is offset by means of shearing along the opposite sides 18 of fastener 12, as indicated at reference numeral 20. The sides 18 of fastener 12 are deformed so that the fastener material flows outwardly to form a pair of spaced protrusions 22 which interlockingly engage the sheared edges 20 and so that a pair of flared lips 21 are formed along sheared edges 20.

The edges of support strap 16 are also preferably deformed in a direction toward and slightly around the fastener, as shown at 24, to interlockingly retain fastener 12. An opening 30 is punched or otherwise formed in the support strap 16 in alignment with hole 32 in the fastener to allow a bolt, stud or screw to be threadably inserted into hole 32 for mounting another member (not shown) to the assembly.

Figure 4:
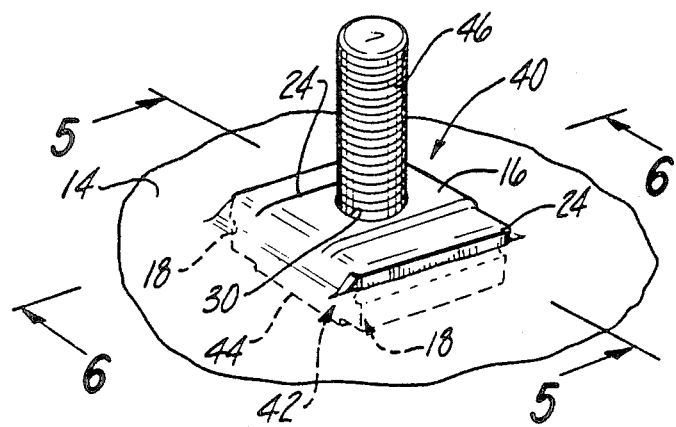
FIG. 4 is a perspective view of an alternate fastener assembly according to the present invention wherein a male fastener is secured to sheet material.
Figure 5:
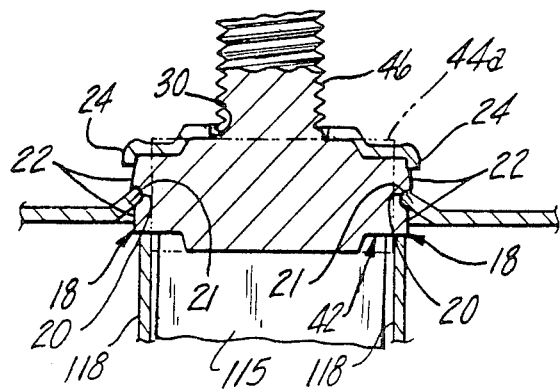
FIG. 5 is a cross-sectional view taken along line 5—5 of FIG. 4.
Figure 6:
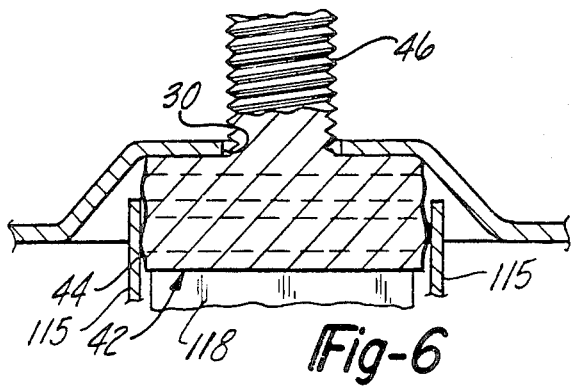
FIG. 6 is a cross-sectional view taken along line 6—6 of FIG. 4.

FIGS. 4 through 6 illustrate a fastener assembly 40 in which a male fastener 42 is secured to sheet material 14. In its original form, fastener 42 is a simple inexpensive square-headed bolt having head 44 and threaded stud 46. The original form of head 44 is indicated in phantom lines at 44a. Head 44 is secured to the sheet material in a manner similar to that described above in connection with female fastener 12 except that stud 46 protrudes through opening 30 in support strap 16. Alternatively, however, fastener 42 may be oriented in a position opposite to that shown in FIGS. 4 through 6, with stud 46 extending in the opposite direction, and thus support strap 16 would not require an opening 30. Because fastener 42 is otherwise secured to sheet material 14 in the same manner as is described above in connection FIGS. 1 through 3, corresponding reference numerals are used in FIGS. 4 through 6.

The embodiments of FIGS. 1 through 6 accommodate the use of standard threaded fasteners with no special configurations or pilots being required. The cost of such standard fasteners has been found to be approximately one-half of that of many specially shaped piercing-type fasteners. Furthermore, the resulting strength of the joint created by the fastener assemblies of the present invention have been found to be superior to joints formed using many specially formed fasteners. Specifically, the pull-out strength of the joint, which is the strength of the joint in resisting a force tending to pull the fastener upwardly away from the sheet material, as shown, has been found to be significantly greater than that of many prior art fastener assemblies. Such improvement is believed to be due to the full interlocking engagement with the sheet material on two opposite sides of the fastener and to the support strap 16 extending over one face of the fastener. Similarly, the push-out strength, which is the strength of the joint resisting a force tending to push the fastener away from the sheet material in the opposite direction, has also been found to compare favorably with that of the prior art fastener assemblies.

In FIGS. 7 through 13, an exemplary joint-forming apparatus 60 is shown for purposes of illustration. One skilled in the art will readily recognize, however, that other similar apparatus may be used to accomplish the objectives of the present invention.

Apparatus 60 includes a punch assembly 62, shown in FIG. 12 in a partially lowered position, and an anvil assembly 64. Punch assembly 62 is operatively connected to a ram or press apparatus 66 which drives it in a reciprocating manner, and also includes a keeper member 68 which has a bore 69 extending partially therethrough for slidably receiving a circular punch 70 and a tubular driver member 72 therein. Driver member 72 includes a die portion 74 on its lower end (as shown) and is retained within bore 69 by a retaining member 76 which allows limited reciprocating movement and prevents rotation of the driver member 72 within bore 69. Punch 70, at its upper end (as shown), abuttingly engages the closed end of bore 69. A compression spring 78 biases driver member 72 out of bore 69, thereby allowing the driver member to perform a stripping function, as will be explained below.

Adjustment nut 116 may be threadably advanced or retracted to adjust the point of engagement by punch assembly 62 and thus the stroke length of driver member 72. Jam nut 117 lockingly abuts adjustment nut 116 to maintain its axial position on driver member 72.

As illustrated in FIGS. 3 and 8, a pair of opposed retaining springs 115 on driver member 72 resiliently engage opposed sides of female fastener 12 to support it in proper alignment with anvil assembly 64, as explained below. Alternately, as shown in FIGS. 5, 6 and 9, a second pair of opposed retaining springs 118 are also used to resiliently engage corresponding sides of male fastener 42. Springs 118 are shorter than springs 115, to avoid interfering with the forming of protrusions 22 on the fastener, and thus engage the sides of fastener 42 only when head 44 is in its original form 44a, as shown in FIG. 5. One skilled in the art will readily recognize that similar retaining spring arrangements may be employed for fasteners having other than four-sided heads.

Anvil assembly 64 includes a fixed die member 84 having a die surface 86 thereon. Die portion 74 and die member 84 each have a pair of spaced shoulders 75 and 85, respectively, which deform the sides of the fastener, as shown in FIG. 13, to form the protrusions 22 thereon (see FIGS. 2 and 5). A pair of cutting members 88, in the form of die blades, are pivotally connected to the fixed die member 84 by means of a pair of pivot pins 90. Die member 84 includes a pair of integral shoulders 114 slidably abutted by corresponding surfaces 112 on cutting members 88. Thus, any vertical forces on the cutting members 88 are thus transmitted directly to die member 84 and are not absorbed by pins 90, as is fully described in my above-referenced related applications. A corresponding pair of compression springs 92 bias the cutting members 88 toward their positions adjacent die surface 86, as shown in FIGS. 12 and 13. Fixed die member 84 also includes a bore 96 extending therethrough, which communicates with bore 117 in an adjusting screw 119 and is configured to accommodate punch 70 and to provide for disposal of the blank 102 of sheet material which is removed by punch 70.

For purposes of illustration, the operation of apparatus 60 is described herein in connection with the attachment of a female fastener to the sheet material, substantially in one operation. As will be readily recognized by one skilled in the art, however, the operation of apparatus 60 in connection with the use of a male fastener is similar, with the minor exceptions noted below.

FIGS. 10 and 11 illustrate an automatic fastener feed apparatus 140 for use with forming apparatus 60 in lieu of the retaining springs discussed above. A fastener feed chute 142 serially transports a number of female fasteners 12 by gravity or under air pressure to a fastener carrier mechanism 144. A retractible pin 148, which may be actuated in any suitable manner, holds back the supply of fasteners until the carrier mechanism is cleared.

The carrier mechanism 144 includes an opening 150 having a cross-sectional shape corresponding to the cross-section of the fastener to ensure proper fastener orientation and alignment with die portion 74 and die member 84 during the forming operation. A plurality of balls 152, biased by springs 156, extend partially into opening 150 to support the fastener until it is engaged by driver member 72. As the fastener is urged downwardly, springs 156 compress and balls 152 retract, and the fastener is forced through opening 150 to engage sheet material 14, as discussed below.

One skilled in the art will readily recognize that similar apparatus may be employed for automatically feeding male fasteners 42 to forming apparatus 60. In such an apparatus, for example, chute 142 would include a longitudinal slot for receiving stud 46, thus allowing head 44 to be transported in a manner similar to that shown in the drawings for fastener 12. Carrier mechanism 144 would also include a corresponding vertical slot to provide clearance for stud 46 at the junction with chute 142.

Referring primarily to FIGS. 12 and 13, the operation of apparatus 60 is as follows. Sheet material 14 is positioned over anvil assembly 64 so that the area in which the fastener assembly is to be formed lies directly below punch assembly 62. Fastener 12 is loaded onto driver member 72, with punch 70 extending through hole 32 if opening 30 is desired. The loading of fastener 12 on apparatus 60 may be accomplished manually, as shown in FIG. 12, or by means of an automatic feed mechanism, such as that illustrated in FIGS. 10 and 11.

Ram 66 is then further actuated to drive punch assembly 62 downwardly, whereby punch 70 forms opening 30 and die portion 74 forcibly presses fastener 12 against sheet material 14 (after keeper member 68 has moved into an abutting relationship with driver member 72). If an opening having a larger diameter than the inside diameter of threaded hole 32 is desired, it may be preformed in the sheet material. Blank 102, resulting from the forming of opening 30, drops into bore 96 for disposal. Thereafter, die portion 74 presses fastener 12 against the sheet material 14 with sufficient force that the leading edges or corners of the opposite sides 18 coact with the inner edges of die blades 88 to cause the sheet material to be sheared or lanced along sides 18. The fastener continues to be forced through the sheet material to offset support strap 16 in abutting and conforming engagement with the face of the fastener.

Once support strap 16 contacts shoulders 85 on die member 84, both fastener 12 and support strap 16 are further deformed between shoulders 75 and 85 to cause the material of fastener 12 to begin to flow outwardly, forming protrusions 22 which interlockingly engage edges 20 of the sheet material. As protrusions 22 are formed, cutting members 88 are pivoted outwardly as shown in FIG. 13. Continued deformation of support strap 16 and fastener 12 also causes edges 20 to bend toward die member 84 to form the flared lips 21 shown in FIGS. 2 and 5. A portion of support strap 16 is also deformed to interlock with the sides 18 as a result of the above deformation.

Driver member 72 restrains the fastener as the punch 70 retracts, thereby aiding in the stripping of punch 70 from hole 32. As punch assembly 62 continues to retract, driver member 72 is raised so that the sheet material may be removed.

The apparatus for attaching fastener 42 to the sheet material is similar to that described above. Because stud 46 protrudes from head 44, however, opening 30 in support strap 16 is preferably pre-punched so that stud 46 may be inserted therein, and fastener assembly 40 is then formed as described above. If, however, fastener 42 is to be oriented with stud 46 protruding away from support strap 16, pre-punching would not be required.

The sheet material may be embossed in an area surrounding the fastener, if desired, to create a flush, generally coplanar relationship between the sheet material and a face of the fastener. Such embossing may be performed prior to securing the fastener to the sheet material or simultaneously therewith by means of specially formed die surfaces.

The foregoing discussion and the accompanying drawings disclose, illustrate and describe merely exemplary methods and embodiments of the present invention. One skilled in the art will readily recognize from such discussion and drawings that various changes, modifications and variations may be made therein without departing from the spirit and scope of the invention as defined in the following claims.

I claim:

1. An assembly comprising a fastener having at least one face and at least one side, sheet material, a strap integral with said sheet material and offset relative to at least a portion of the remainder of said sheet material other than said integral strap, said strap engaging said face of said fastener to restrain said fastener in a first direction, at least one lip integral with said remainder of said sheet material and protruding generally toward said strap and engaging said side of said fastener to restrain said fastener in a second opposite direction.

2. In an assembly having a fastener secured to sheet material, said fastener having at least one face and at least two opposite sides, the improvement wherein said sheet material includes an integral support strap offset relative to the plane of at least a portion of the remainder of said sheet material other than said integral strap, said opposite sides of said fastener interlockingly engaging the remainder of said sheet material, whereby said fastener is rigidly secured to said sheet material and supported by said support strap.

3. The improvement according to claim 2, wherein a portion of said support strap engages at least one of said opposite sides of said fastener.

4. In an assembly having a fastener secured to sheet material, said fastener having at least one face and at least two opposite sides, the improvement wherein said sheet material includes an integral support strap offset relative to the plane of at least a portion of the remainder of said sheet material other than said integral strap, said opposite sides of said fastener each having a pair of spaced protrusions thereon interlockingly engaging at least a portion of said remainder of said sheet material therebetween, whereby said fastener is rigidly secured to said sheet material and supported by said support strap.

5. The improvement according to claim 4, wherein said portion of said remainder of said sheet material includes at least one flared lip thereon, said spaced protrusions interlockingly engaging said flared lip therebetween.

6. The improvement according to claim 2, wherein said fastener includes a threaded aperture extending therethrough, and said support strap includes an opening therethrough corresponding to, and communicating with, said threaded aperture.

7. The improvement according to claim 6, wherein said fastener comprises a standard square nut deformed to have said spaced protrusions by forcibly compressing said fastener and said sheet material between a pair of die means in order to forcibly urge said opposite sides of said fastener outwardly into said interlocking engagement with said portion of said remainder of said sheet material.

8. The improvement according to claim 2 wherein said support strap includes an opening therethrough, and said fastener includes a stud portion protruding from said face, said stud portion extending through said opening through said support strap.

9. The improvement according to claim 8, wherein said fastener comprises a standard square-headed bolt deformed to have said spaced protrusions by forcibly compressing said fastener and said sheet material between a pair of die means in order to forcibly urge said opposite sides of said fastener outwardly into said interlocking engagement with said portion of said remainder of said sheet material.

10. An assembly comprising a fastener, sheet material, a strap integral with the remainder of said sheet material other than said integral strap and restraining said fastener in a first direction, at least the remainder of said sheet material securingly engaging said fastener to restrain said fastener in a second opposite direction, and a portion of said fastener being deformed into engagement with at least a portion of said remainder of said sheet material.

11. An assembly according to claim 10, wherein said strap is offset relative to the remainder of said sheet material.

12. An assembly according to claim 10, wherein said strap engages a face of said fastener, and wherein at least a portion of said remainder of said sheet material securely engages a side of said fastener.

13. An assembly comprising a fastener, sheet material, a strap integral with the remainder of said sheet material other than said integral strap and restraining said fastener in a first direction, at least the remainder of said sheet material securingly engaging said fastener to restrain said fastener in a second opposite direction, and at least a portion of said remainder of said sheet material being deformed into engagement with at least a portion of said fastener.

14. An assembly according to claim 13, wherein said strap is offset relative to the remainder of said sheet material.

15. An assembly according to claim 13, wherein said strap engages a face of said fastener, and wherein at least a portion of said remainder of said sheet material securely engages a side of said fastener.

16. An assembly comprising a fastener, sheet material, a strap integral with the remainder of said sheet material other than said integral strap and restraining said fastener in a first direction, at least the remainder of said sheet material securingly engaging said fastener to restrain said fastener in a second opposite direction, and at least a portion of said fastener and at least a portion of said remainder of said sheet material both being deformed into engagement with one another.

17. An assembly according to claim 16, wherein said strap is offset relative to the remainder of said sheet material.

18. An assembly according to claim 16, wherein said strap engages a face of said fastener, and wherein at least a portion of said remainder of said sheet material securely engages a side of said fastener.

19. In an assembly having a fastener secured to sheet material, said fastener having at least two opposite sides, the improvement wherein said sheet material includes an integral support strap offset relative to the remainder of said sheet material other than said integral support strap, said opposite sides of said fastener securingly engaging the remainder of said sheet material, whereby said fastener is secured to said sheet material and supported by said support strap, and a portion of said support strap engaging at least one of said opposite sides of said fastener.

20. In an assembly having a fastener secured to sheet material, said fastener having at least two opposite sides, the improvement wherein said sheet material includes an integral support strap offset relative to the remainder of said sheet material other than said integral support strap, said opposite sides of said fastener securingly engaging the remainder of said sheet material, whereby said fastener is secured to said sheet material and supported by said support strap, and the opposite sides of said fastener each having a pair of spaced protrusions thereon interlockingly engaging at least a portion of said remainder of said sheet material therebetween.

21. The improvement according to claim 20, wherein said portion of said remainder of said sheet material includes at least one flared lip thereon, said spaced protrusions on at least one of the opposite sides of said fastener interlockingly engaging said flared lip therebetween.

22. In an assembly having a fastener secured to sheet material, said fastener having at least two opposite sides, the improvement wherein said sheet material includes an integral support strap offset relative to the remainder of said sheet material other than said integral support strap, said opposite sides of said fastener securingly engaging the remainder of said sheet material, whereby said fastener is secured to said sheet material and supported by said support strap, and said fastener including a threaded aperture extending therethrough, and said support strap including an opening therethrough corresponding to, and communicating with, said threaded aperture.

23. The improvement according to claim 22, wherein said fastener comprises a standard square nut.

24. In an assembly having a fastener secured to sheet material, said fastener having at least two opposite sides, the improvement wherein said sheet material includes an integral support strap offset relative to the remainder of said sheet material other than said integral support strap, said opposite sides of said fastener securingly engaging the remainder of said sheet material, whereby said fastener is secured to said sheet material and supported by said support strap, and said support strap including an opening therethrough, and said fastener includes a stud portion protruding therefrom, said stud portion extending through said opening through said support strap.

25. The improvement according to claim 24, wherein said fastener comprises a standard square-headed bolt.

26. In an assembly having a fastener secured to sheet material, said fastener having at least two opposite sides, the improvement wherein said sheet material includes an integral support strap offset relative to the remainder of said sheet material other than said integral support strap, said opposite sides of said fastener securingly engaging the remainder of said sheet material, whereby said fastener is secured to said sheet material and supported by said support strap, and a portion of said fastener being deformed into engagement with at least a portion of said remainder of said sheet material.

27. In an assembly having a fastener secured to sheet material, said fastener having at least two opposite sides, the improvement wherein said sheet material includes an integral support strap offset relative to the remainder of said sheet material other than said integral support strap, said opposite sides of said fastener securingly engaging the remainder of said sheet material, whereby said fastener is secured to said sheet material and supported by said support strap, and at least a portion of said remainder of said sheet material being deformed into engagement with at least a portion of said fastener.

28. In an assembly having a fastener secured to sheet material, said fastener having at least two opposite sides, the improvement wherein said sheet material includes an integral support strap offset relative to the remainder of said sheet material other than said integral support strap, said opposite sides of said fastener securingly engaging the remainder of said sheet material, whereby said fastener is secured to said sheet material and supported by said support strap, and at least a portion of said fastener and at least a portion of said remainder of said sheet material both being deformed into engagement with one another.

* * * * *